United States Patent [19]

Hirano et al.

[11] Patent Number: 5,426,278
[45] Date of Patent: Jun. 20, 1995

[54] LASER IRRADIATING TORCH

[75] Inventors: Kenji Hirano, Yokohama; Norio Morishige, Yokosuka; Kiyofumi Ishikawa, Hiratsuka; Shuji Furuya, Yokohama, all of Japan

[73] Assignee: Ishikawajima-Harima Heavy Industries Co., Ltd., Tokyo, Japan

[21] Appl. No.: 89,193

[22] Filed: Jul. 12, 1993

[30] Foreign Application Priority Data

Jul. 15, 1992 [JP] Japan ................. 4-188454

[51] Int. Cl.⁶ ............................................. B23K 26/00
[52] U.S. Cl. ........................... 219/121.63; 219/121.74; 219/121.83; 219/121.84
[58] Field of Search ...................... 219/121.63, 121.64, 219/121.78, 121.79, 121.84, 121.74, 121.83, 121.65, 121.66, 121.75

[56] References Cited

U.S. PATENT DOCUMENTS

| | | | |
|---|---|---|---|
| 4,459,986 | 7/1984 | Karaki | 219/121.83 |
| 4,839,495 | 6/1989 | Kitera et al. | 219/121.78 |
| 4,892,992 | 1/1990 | Akeel et al. | 219/121.78 |
| 4,983,796 | 1/1991 | Griffaton | 219/121.78 |
| 5,097,110 | 3/1992 | Hamada et al. | 219/121.63 |
| 5,117,086 | 5/1992 | Boudot et al. | 219/121.64 |
| 5,182,429 | 1/1993 | Pirl et al. | 219/121.63 |
| 5,196,671 | 3/1993 | Kroehnert | 219/121.63 |
| 5,227,605 | 7/1993 | Boudot et al. | 219/121.63 |

FOREIGN PATENT DOCUMENTS

| | | | |
|---|---|---|---|
| 61-63387 | 4/1086 | Japan | 219/121.63 |
| 3-99787 | 4/1991 | Japan | |
| 3-128183 | 5/1991 | Japan | 219/121.78 |

Primary Examiner—Geoffrey S. Evans
Attorney, Agent, or Firm—Finnegan, Henderson, Farabow, Garrett & Dunner

[57] ABSTRACT

A laser irradiating torch device is used to apply corrosion resistant coating or other coatings to an inner surface of small diameter piping. The torch device consists basically of a torch body disposed in the rearward end of the torch device; a revolving torch head disposed in the forward end of the torch device which revolves around the central axis of the torch device; and a driving device to rotate the torch head disposed in the rearward end. A laser beam generated outside the torch device is transmitted to the torch head in an optical fiber disposed, longitudinally through the central axis, and the focal point of the laser beam can be adjusted with a lens system whose location can be adjusted in the axial direction. The transmitted laser beam is reflected radially out of the torch device with a reflection mirror, and the lens system is adjusted so that the laser beam is focused near the inner surface of the piping. When the torch device is inserted in the piping, a centering device aligns the torch body and the torch head centrally within the piping so that the revolving axis of the torch device coincides with the central axis of the piping. When the torch head is rotated and the laser beam turned on, the inner wall surfaces of the piping is heated uniformly to produce a coating of excellent consistency, thus producing a coating having superior corrosion resistant properties.

11 Claims, 7 Drawing Sheets

LASER IRRADIATING TORCH

BACKGROUND OF THE INVENTION

1. Field of the Invention

The present invention relates to a laser irradiating torch device used for applying a corrosion resistant coating and other like coatings on the internal surfaces of a small diameter piping.

2. Technical Background

Lasers have been used for fabrication, such as cutting and making holes in metallic materials, and laser fabrication devices of various kinds are on the market. In the field of nuclear power generation, to improve corrosion resistance performance in nuclear facility, laser devices have been used to apply a corrosion resistant metallic coating on internal surfaces of piping circuits.

Application of a coating in such cases generally involves painting a material containing a binder and metallic powder of corrosion resistant metals on the interior surface of the piping, which is followed by laser heating to vaporize the binder and melt the metallic powder to form a coating layer. By adopting such a procedure, it is necessary to heat only the surface layer of the piping interior, thus avoiding possible deformation and property changes which could be caused by heating the entire piping component.

However, the piping in nuclear facilities tends to be small diameter (30 to 40 mm diameter) and long length (about 5 m), and the existing laser technology does not readily allow insertion of a laser device to such narrow diameter piping. In particular, application of corrosion resistant coating to the deep recesses of the piping by laser technique was extremely difficult.

As an example of such laser coatings, a laser irradiating torch device is disclosed in a Japanese Patent Application, First Publication H3-99787, for internal surfaces of small diameter piping. This laser irradiating torch device is provided with a cylindrical torch body which is attached to the tip of optical fiber which transmits a laser beam. At the tip of the torch body is disposed a torch head of approximately the same outside diameter as the torch body. The outside diameters of the torch body and the torch head are smaller than the inside diameter of the small diameter piping into which the torch device is to be inserted. In the interior of the torch body, there is disposed a set of lenses to focus the laser beam transmitted by optical fiber. In the interior of the torch head, there is disposed a reflecting mirror which reflects the laser beam which passes through the aforementioned set of lenses. On the sidewalls of the torch head, there is disposed a radially directed small diameter hole. The laser beam reflected by the reflecting mirror is radiated to the outside of the torch head through the small hole.

The laser beam from the torch head is directed to every part of the inner surface of small diameter piping in the following manner. A torch device is inserted into a small diameter hole, and in this condition, the torch body can be either fully rotated around its own axis or linearly translated along the longitudinal direction. While the torch body is either rotated or translated, the laser beam is transmitted through the optical fiber. As a result, the laser is radiated to the various locations, thereby every part in the inner surface of piping can be irradiated with the laser beam.

However, there are following problems associated with the laser irradiating torch device which works as described above.

(A) When it is necessary to irradiate the inner surface of the piping, the torch device is revolved while being moved along longitudinally, therefore it is generally difficult to coincide the centers of rotation of the torch device with that of the piping. It follows that the variations, in the distance between the radiation hole at the torch head to the inner surface of piping, can occur at different locations along a pipe, resulting in non-uniformity in the power of laser beam delivered to the various locations in the circumferential and longitudinal directions.

(B) The rotation of the torch device itself can lead to the application of twisting torque to the optical fiber connecting the laser beam source and the torch device.

(C) The reflection mirror which is placed at the deep end of the small diameter piping is not cooled and it is subject to thermal degradation, The frequent periodic maintenance required represents an increase in the operational steps, (D) The laser beams scattered back into the optical fiber from the inner surface of the piping can lead to degradation of the performance of the optical fiber,

SUMMARY OF THE INVENTION

An objective of the present invention is to present a torch device, which enables to uniformly irradiate the inner surface of small diameter piping with a laser beam, to protect the optical fiber delivering the laser beam and to improve the durability of the reflection mirror used to reflect the laser beam.

The laser irradiating torch device of the present invention comprises: a cylindrical torch body for insertion in the small diameter piping; a positioning device for positioning an axial center of the torch body with the axial center of the small diameter piping; a cylindrical torch head rotatably disposed at the forward end of the torch body and driven by a driving device so as to be freely rotatable around a center of the torch body; an optical fiber insertably disposed through the interior of the torch body for guiding the laser beam generated at the rearward end of the device to the interior of the torch head; a lens holding tube disposed in the interior of the torch head and so as to be freely movable in the longitudinal direction of the torch body; a lens system disposed in the interior of the lens holding tube for focusing the laser beam radiated from the forward tip of the optical fiber and radiating in the longitudinal direction of the torch head; and a reflection mirror freely movably disposed in the longitudinal direction in the interior of the torch head for reflecting the laser beam radially outwardly through a small diameter hole.

According to the torch device of the configuration presented above, the lens system housed in the lens holding tube can be moved together longitudinally to adjust the focal point of the laser beam. After the focal point is adjusted, the torch device is inserted into the small diameter piping. Then, the positioning device automatically centers the torch device within the small diameter piping. The driving device is then turned on to rotate the torch head. In this condition, the torch head disposed at the forward end of the torch body is revolved after having been pre-centered around the central axis of the small diameter piping. When a laser beam is introduced into the optical fiber, the laser beam is radiated continually onto the inner surface of the small diameter piping. According to such an arrangement, it becomes possible to align the central axis of the torch device with that of the small diameter piping, and because only the torch head is revolving, it enables to stabilize the revolution, thereby enabling to uniformly irradiate the inner surface of the piping.

In one embodiment of the present invention, a heat sink member is provided on the reflection mirror, as well as coolant entry and discharge routes. Accordingly, a coolant can be supplied to the reflection mirror, thereby preventing degradation of the reflection mirror.

In another embodiment of the present invention, a protection tubing around the optical fiber to protect the optical fiber and a fiber holding section are provided for holding a bared leading tip of the optical fiber. The surfaces oh the fiber holding section is mirror polished, and together with a separately provided protection tubing, prevent directly radiating the scattered laser beam onto the optical fiber and possibly damage the optical fiber even if the scattered radiation should reach inside the torch body.

DETAILED DESCRIPTION OF THE PREFERRED EMBODIMENTS

In the following, embodiments of the laser irradiating torch device of the present invention will be presented with reference to the figures, In describing the various components of the torch device, the direction is referenced with respect to the longitudinal optical fiber 6, and "forward" refers to the laser beam transmission direction, and "rearward" refers to the laser beam generation direction.

In FIGS. 1 to 9, X refers to small (diameter) piping while the reference numeral 1 refers to a laser irradiating torch device (shortened to torch hereinbelow), 2 is a torch body, 3 is a positioning device, 4 is a driving device, 5 is a torch head, 6 is an optical fiber, 7 is a lens system, 8 is a small (diameter) hole, and 9 is a reflection mirror.

Figure 1:
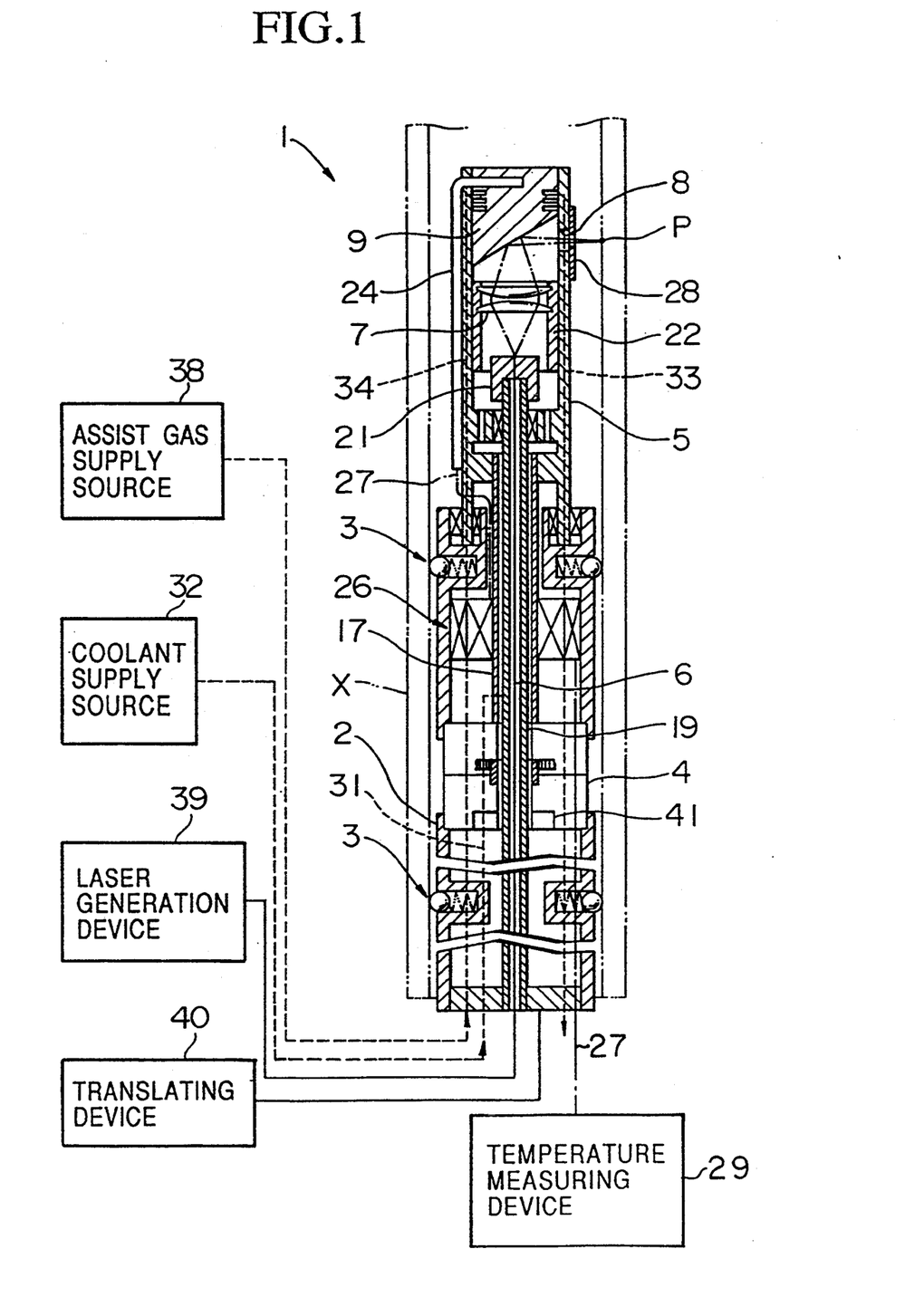
FIG. 1 is a schematic representation of an embodiment of the laser irradiating torch device of the present invention.

As shown in FIG. 1, the torch 1 comprises: a cylindrical torch body which is insertably disposed inside a small piping X, and a cylindrical torch head 5 which is freely rotatably supported at the tip of the torch body 2 around the axis of the torch body 2. The outside diameters of the torch body 2 and the torch head 5 are set to be less than the inner diameter of the small piping X. The torch body 2 is provided with the positioning device 3 which governs positioning of the torch in the radial direction within the piping X. The torch head 5 is provided with the driving device 4 to rotate the torch head 5.

The torch body 2 is provided with an optical fiber 6, which longitudinally passes through the torch body 2, for transmitting a laser beam to the interior of the torch head 5. At the forward end of the optical fiber 6 is a lens system 7 distanced from the terminal end of the optical fiber 6, and serving the purpose of focusing the laser beam transmitted therethrough. At the forward end of the lens system 7 is a reflection mirror 9 distanced therefrom, and serving the purpose of reflecting the laser beam transmitted through the lens system 7. At the side of the torch head 5 is disposed a radially directed small hole 8 serving the purpose of externally radiating the laser beam reflected by the reflection mirror 9.

The torch 1 is operatively connected to a translating device 40 which moves the torch 1 in the longitudinal direction. The translating device 40 is a commonly known linear motion arrangement made of a ball and screw mechanism. The operation of the translating device 40 permits the torch 1 to be moved along the piping X in the longitudinal direction.

Figure 2:
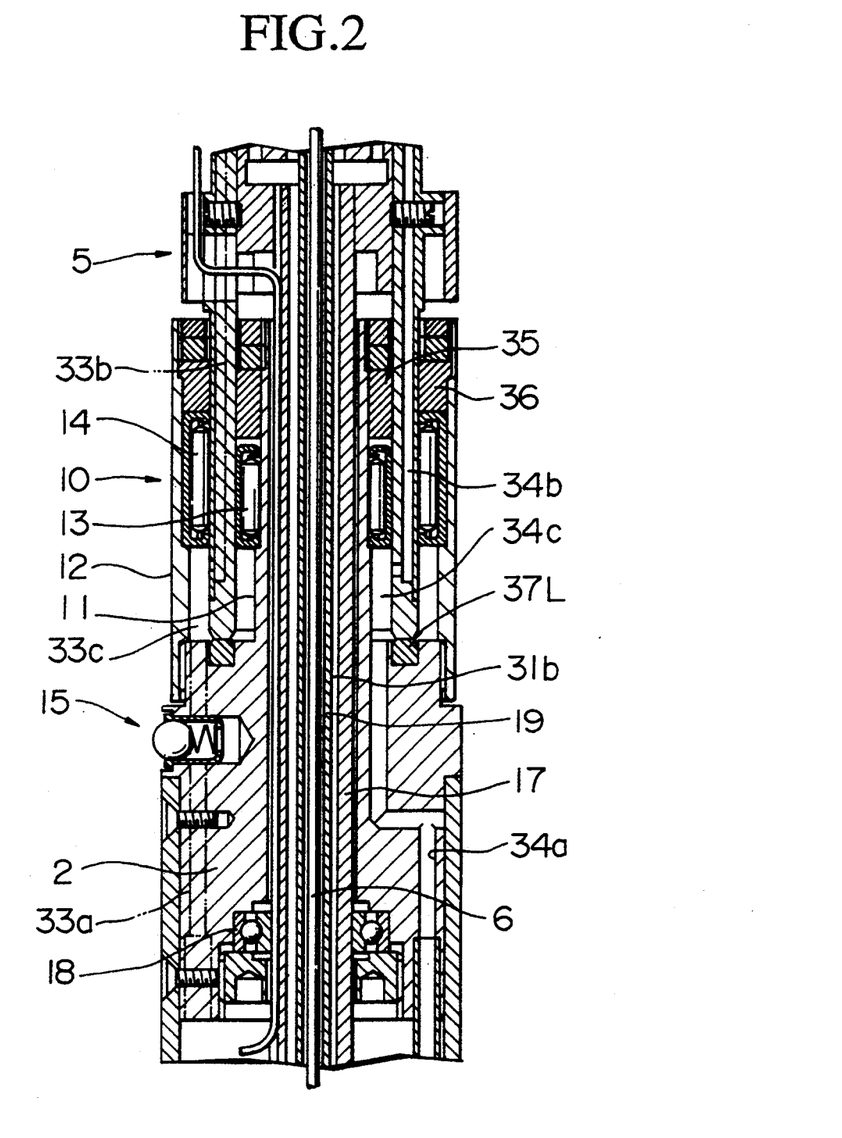
FIG. 2 is a cross sectional view of the support section for the torch head shown in FIG. 1.

The torch body 2 is constructed in a cylindrical manner, as shown in FIG. 2. At the tip end of the torch body 2 is disposed a head support section 10 which freely rotatably supports the torch head 5, which will be described later, around the axis thereof. The head support section 10 is made as a double-wall cylinder unit comprising an inner cylinder 11 and an outer cylinder 12. The outer surface of the inner cylinder 11 and the inner surface of the outer cylinder 12 are provided with a pair of coaxial bearings 13.14 in contact with the respective surfaces.

Figure 3:
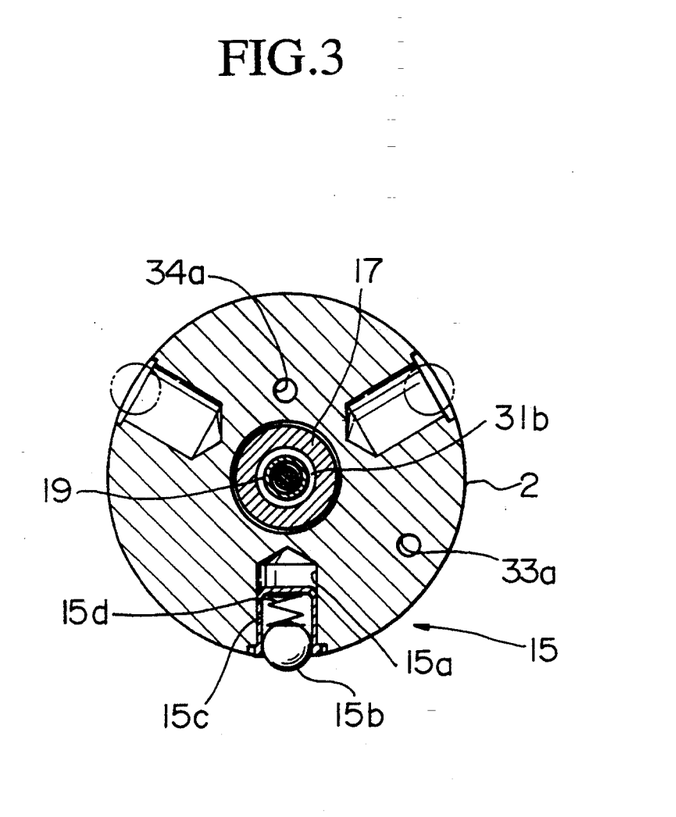
FIG. 3 is a cross sectional view of the positioning of the laser irradiating torch device shown in FIG. 1.

The positioning devices 3 comprises a plurality of positioning section 15 which are spaced along the torch body 2 in the longitudinal direction. The positioning section 15, as illustrated in FIG. 3, is provided with three guide holes 15a whose openings face towards the outer surface of the torch body 2, and are disposed equidistantly around the peripheral circumference and diverting outwardly. Each of the guide holes 15a is provided with a small sphere 15b which is freely movable in the longitudinal direction of the guide hole 15a. The small sphere 15b is confined in the guide hole 15a by means of a retaining jig 15c. A biasing spring 15d disposed inside the guide hole 15a pushes the small sphere 15b outwardly with a uniform force so that all the three small spheres 15b are pressed against the inner surface of the piping X. This arrangement assures that the central axes of the torch body 2 and the piping X are coincided.

Figure 4:
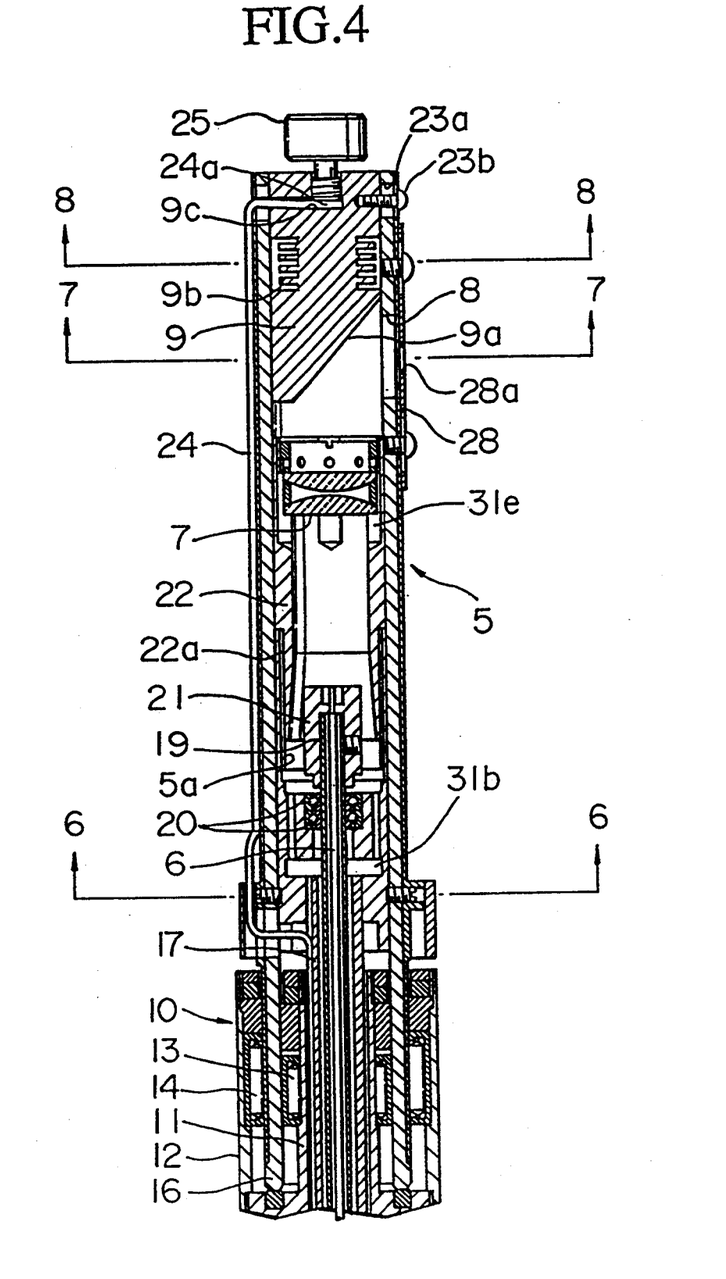
FIG. 4 is a cross sectional view of the torch head of the laser irradiating torch device shown in FIG. 1.

As shown in FIG. 4, the torch head 5 is a cylindrical device, and is joined to a support tube 16 at its rearward end. The support tube 16 is clamped and supported by a pair of bearings 13.14 around the radial periphery thereof in the head support section 10. The support tube 16 is restrained radially by the bearing 13.14 so that the torch head 5 will freely rotate coaxially with the torch body 2 without tilting radially and shifting the location of the laser beam.

Figure 5:
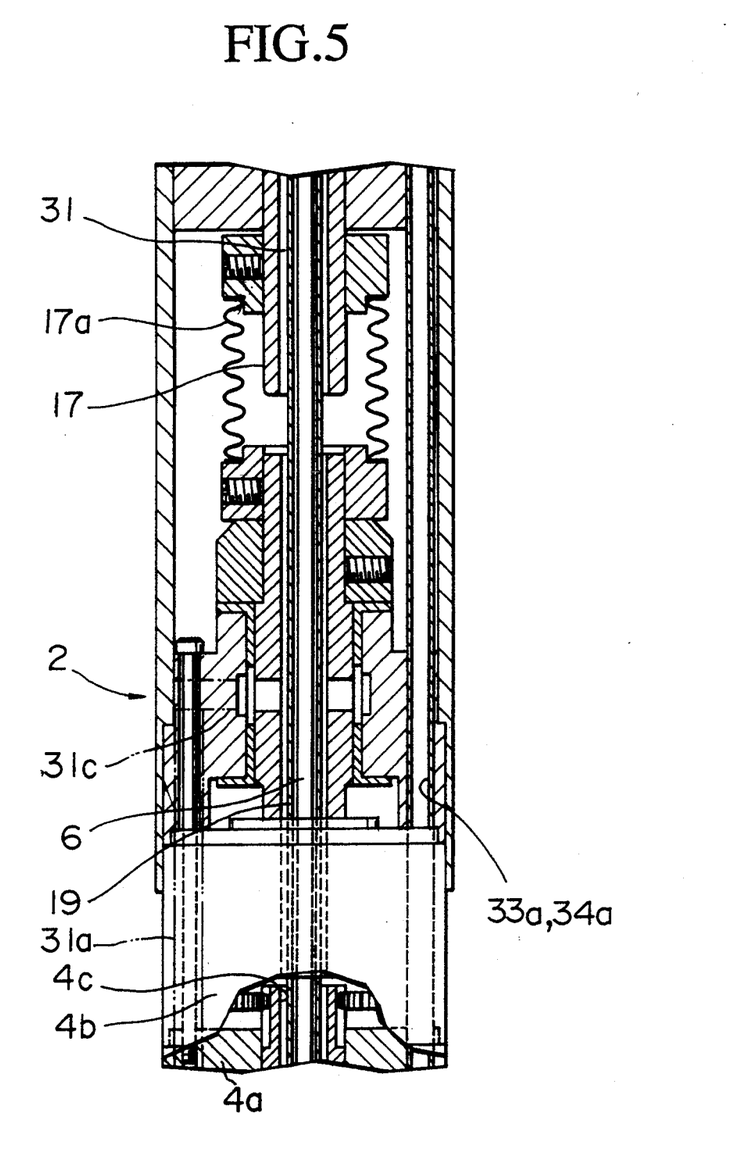
FIG. 5 is a cross sectional view of the driving section of the laser irradiating torch device shown in FIG. 1.

As shown in FIG. 4, in the interior of the support tube 16 there is a coaxial drive shaft 17 which extends back into the torch body 2 through the inner cylinder 11 of the torch body 2 with a spacing in the radial direction. The rearward end of the drive shaft 17 is joined to the driving device 4 disposed in the torch body 2 via a connector 17a, as shown in FIG. 5. This driving shaft 17 also is provided with a bearing 18 disposed between itself and the torch body 2. This arrangement further reinforces the support provided by the pair of bearings 13.14 and ensures that the torch head 5 does not tilt.

In the interior of the drive shaft 17 is a protection tubing 19 which extends through all the length of the torch body 2. The protection tubing 19 serves as a protection for the sheath of the optical fiber 6. The forward end of the protection tubing 19 is disposed inside the torch head 5, and the rearward end thereof is fixed to the torch body 2.

As shown in FIG. 4, a bearing 20 is disposed between the protection tubing 19 and the torch head 5 for isolation of the turning torque of the torch head 5 from the protection tubing 19. The bearing 20 also serves as a centering device to locate the protection tubing 19 in the axial center of the torch head 5.

The forward end of the protection tubing 19 is provided with a fiber holding section 21 to position the optical fiber 6. The fiber holding section 21 is made of a metallic material such as copper, and serves as a retaining device to hold the bared optical fiber 6 (by removing the sheath made of nylon, for example) extending into the torch head 5. The surfaces of the fiber holding section 21 is mirror polished as to reflect scattered laser beams.

Inside the torch head 5, there is a lens system 7, shown in FIG. 4, which focuses the laser beam radiated from the optical fiber 6. The lens system 7 is made, for example, by facing together the spherical surfaces of a pair of hemispherical lenses and holding the paired lens with a lens holding tube 22. The outer peripheral surface of the lens holding tube 22 is provided with male threads 22a. The inner surface of the torch head is provided with female screws 5a. The male threads 22a is meshed with the female threads 5a, thereby engaging the lens holding tube 22 with the torch head 5. Because the male threads 22a is meshed with the female threads 5a, a relative rotation of the torch head 5 with respect to the lens holding tube 22 varies the longitudinal location of the tip end of the optical fiber 6 with respect to that of the lens system 7, thereby enabling to adjust the focal point P of the laser beam.

In the forward region of the lens system 7 of the torch head 5, there is the reflection mirror 9 which reflects the laser beam radiated from the optical fiber 6 and transmitted through the lens system 7. The reflection mirror 9 is made of a metallic material such as copper and is in a form of a cylinder whose end plane is sliced at an angle of 45° to 55° to the cylinder axis. The reflection mirror 9 includes a mirror-polished reflecting surface 9a. This arrangement permits the laser beam transmitted through the lens system 7 to be reflected and bent at the reflecting surface 9a and directed to the inner surface of the piping X. The outer diameter of the reflection mirror 9 is dimensioned to fit snugly with the inner diameter of the torch head 5. The reflection mirror 9 is fixed to the mirror attachment hole 23a which passes through the wall of the torch head 5 with a bolt 23b. The mirror attachment hole is made oblong in the longitudinal direction of the torch head, permitting the reflection mirror to be positioned in the longitudinal direction.

The reflection mirror 9 is provided with a heat dissipation fin 9b (heat sink member) which is disposed in the mirror cooling circuit, to be described later, and serves to cool the reflection mirror 9 which has been heated by the laser beam irradiation. The reflection mirror 9 is provided also with a thermocouple 24 (temperature measuring means), which follows along the outer surface of the torch head 5 and is disposed at the back surface side of the small hole 8 which is irradiated with the laser beam. The measuring member 24a is at the tip of the thermocouple 24, and is insertably disposed in a radially extending measuring hole 9c. The measuring member 24a is in close contact with the inside surface of the measuring hole 9c by means of a press down bolt 25 so as to enable accurate determination of the temperature of the reflection mirror 9.

The temperature signal generated by the arrangement of the thermocouple 24 as presented above must in some way be transmitted from the rotating torch head 5 side to the fixed torch body 2 side. This is accomplished by means of a slip ring 26 which electrically connects the signal wire 27 with a temperature measuring device 29, through the torch body 2, disposed at the outer section of the piping X.

Figure 9:
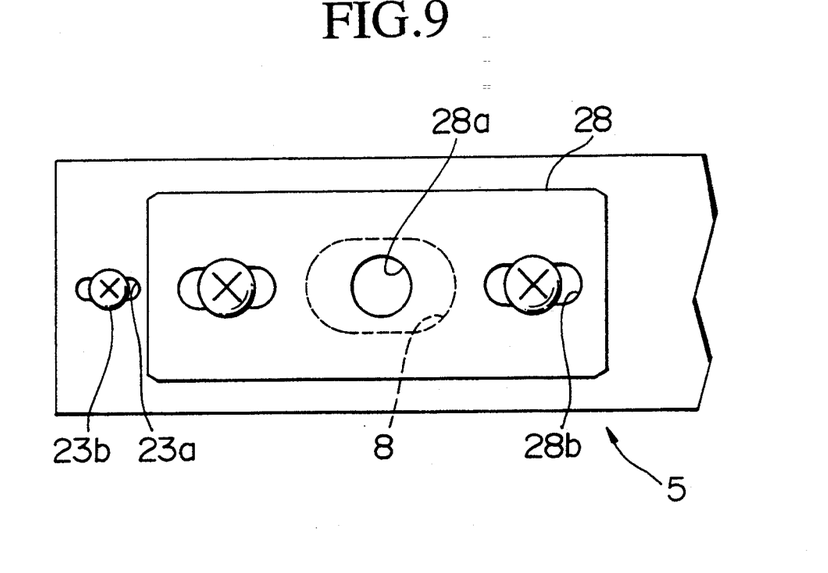
FIG. 9 is a front view of the radiation shield of the laser irradiating torch device shown in FIG. 1.

On the sidewall of the torch head 5, there is a small hole 8 through which the laser beam is radiated. The shape of the small hole is made oblong so as to accommodate the changes in the path of the laser beam which occurs as a result of adjustments of the location of the reflection mirror 9. The outer surfaces of the torch head 5 close to the small hole 8 are protected from the scattered laser beam reflecting from the inner surface of the piping X with a radiation shield 28. The radiation shield 28 is made of high melting point metals such as tantalum, whose surface is mirror polished to increase the reflectivity. The reflection shield 28 is provided with a head through hole 28a, as illustrated in FIG. 9, having the minimum allowable opening area to let the laser beam pass therethrough. The radiation shield 28 is provided with attachment holes 28b of an oblong shape to permit the radiation shield 28 to be moved optimally in accordance with the changing location of the head through hole 28a, introduced by adjustments in the location of the reflection mirror 9.

The torch head 5 and the torch body 2 are provided with a mirror coolant route 30 and an assist gas supply route 31 which longitudinally pass therethrough and serve as passage for coolants, such as air, to be directed to the vicinity of the cooling fin 9b for the reflection mirror 9.

The mirror coolant route 30 is provided with a coolant supply route 33, which is connected to the coolant supply source 32, to supply a coolant to the vicinity of the cooling fin 9b, and a coolant discharge route 34 which discharges the spent coolant to outside the torch 1.

Figure 6:
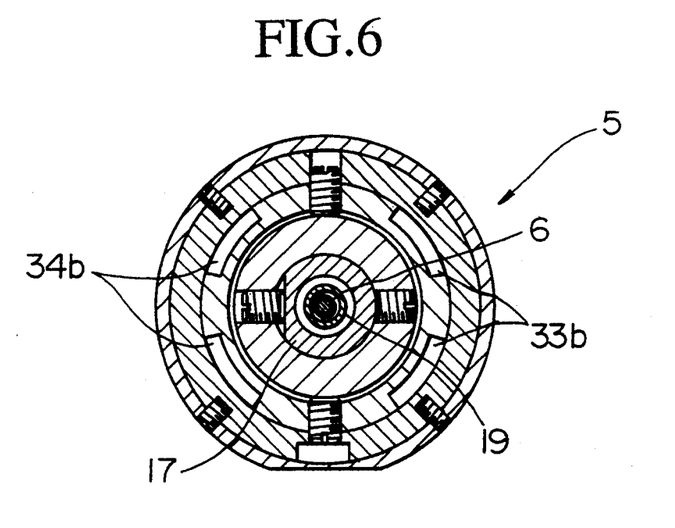
FIG. 6 a cross sectional view of a section at 6—6 in FIG. 4.
Figure 7:
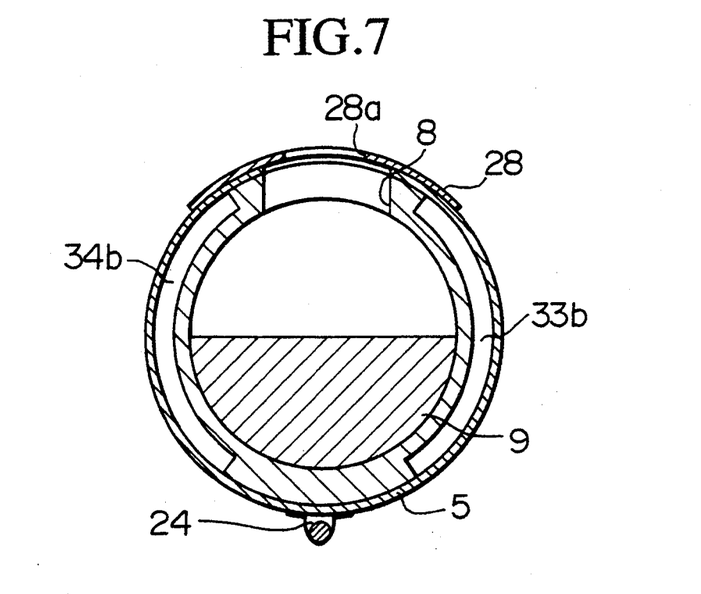
FIG. 7 a cross sectional view of a section at 7—7 in FIG. 4.
Figure 8:
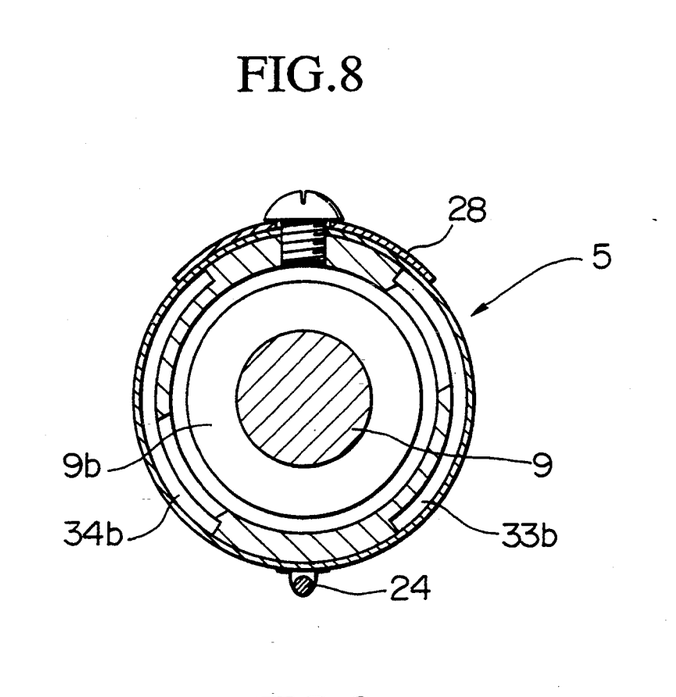
FIG. 8 a cross sectional view of a section at 8—8 in FIG. 4.

As shown in FIG. 5, the coolant supply route 33 and the coolant discharge route 34 comprise: a supply pipe 33a and a discharge pipe 34a which guide the coolant from the rearward end of the torch 1 to the head support section 10; an in-wall supply route 33b formed inside the wall of the torch head 5 and an in-wall discharge route 34b formed inside the wall of the torch head 5 as shown in FIGS. 6 to 8; and coolant connecting route 33c.34c which connect the in-wall supply route 33b with the supply pipe 33a, and the in-wall discharge route 34b with the discharge pipe 34a.

As shown in FIG. 2, the connecting routes 33c.34c are constructed as two separated ring-shaped spaces by closing the ends of the spaces formed by an inner cylinder 11, an outer cylinder 12 and the support tube 16 with packings 35, 36. The coolant connecting route 33c is connected, to the in-wall supply route 33b and supply pipe 33a, and the coolant connecting route 34c is connected to in-wall discharge route 34b and the discharge pipe 34a. This arrangement enables to maintain the connection between the coolant supply route 33 and coolant discharge route 34 at the boundary of the rotating torch head 5 relative to the torch body 2.

The assist gas supply route 31, as shown in FIG. 4 and 5 for example, comprises: a gas supply pipe 31a which passes through the torch 1 from the rear thereof to the forward end of a speed reducer 4b; a tubular coolant route 31b formed by the space between the protection pipe 19 and the drive shaft 17; a connecting coolant passage 31c which connect the gas supply source 31a to the tubular coolant passage; a connecting section 31d which connects the tubular coolant passage 31b to the interior of the torch head 5; and the lens section coolant passage 31e which passes through the space formed by the lens holding tube 22 and bounded by the lens system 7. The assist gas supply passage 31 supplies an assist gas to the interior of torch head 5 from the assist gas supply source 38. The assist gas supplied to the interior of the torch head 5 is expelled through the small hole 8 disposed on the wall surface of the torch head 5 to outside the torch 1.

The (cooling) assist gas is an inert gas such as helium, for example. Passing of the assist gas over the inner wall surfaces of the lens support tube 22 and torch head 5 aids in cooling of the surfaces and in preventing oxidation of the surfaces.

The torch head 5 of the construction described above is connected to the driving device 4, disposed at the rearward end thereof via the drive shaft 17, which rotates the torch head 5 around the axial center. As shown in FIG. 5, the driving device 4 comprises a hollow shaft motor 4a and a speed reducer attached to the hollow shaft motor 4a. The hollow shaft motor 4a has a motor through hole 4c in the center of the rotor. The motor through hole 4c enables optical fiber 6 and the protection tubing 19 to be insertably disposed therethrough. The driving device 4 may comprise an encoder 41 contained therein or connected thereto. This arrangement enables rotational speed and positioning control of the torch head 5.

The procedure for irradiating the inner surface of the small diameter piping (referred to as piping) X using the laser irradiating torch (referred to as the torch) 1 of the construction will be described.

First, the lens holding tube 22, reflection mirror 7 and the reflection shield 28 are positioned to pre-adjust the focal point of the laser beam to suit the inner diameter of the piping X. Next, the torch 1 is inserted into the piping X. In this way, the torch body 2 is centered in the piping X by the positing device 3. This centering assures that the torch head 5 revolves around the central axis of the piping X. The torch 1 is positioned in the use position by means of the translating device 40.

Next, coolant and assist gas are supplied to the torch 1 from the coolant supply source 32 and the assist gas supply source 38. In this condition, the laser generation device 39 is activated and a laser beam is generated and transmitted through the optical fiber 6 to begin radiating the laser beam from the torch head 5, and at the same time the torch head 5 is revolved at a constant speed. The result is that the laser beam focused by the lens system 7 is radially reflected by the reflection mirror 9, and is radiated to the inner wall surface of the piping X through the small hole 8. The laser beam forms a focal point P near the surface of the inner wall surface of the piping X. By revolving the torch head 5, it becomes possible to radiate the laser beam continually around the peripheral direction of the piping X.

During the operation of the laser beam, the interior of the lens holding tube 22 and the torch head 5 are cooled by the assist gas, the interior surfaces are cooled and oxidation is prevented. A part of the assist gas blows out of the small hole 8 of the torch head 5, thereby preventing the intrusion of the scattered debris created by the covering material and others through the small hole 8.

Further, the reflection shield 28 offers protection of the surface of the torch head 5 from the reflected laser radiation from the inner surface of the piping X. The area of the head through hole 28a of the radiation shield 28 is made to be the smallest possible area for allowing the laser beam to radiate out from the torch head 5, and therefore, thereby keeping the amount of the laser beam reflected back into the torch head at a minimum level. The optical fiber 6 is also protected from the reflecting beam within the torch head 5, because of the presence of the fiber holding section 21 and the protection tubing 19, thereby preventing the degradation of the performance of the optical fiber 6.

Further, overheating of the reflection mirror 9 is prevented by the presence of the mirror coolant supply route 33 provided in the heat dissipation fin 9b, thereby improving the durability of the reflection mirror 9. Since the degradation of the reflection mirror 9 is prevented, a stable irradiation operation of the laser beam of the piping X can be achieved. The provision of a thermocouple 24 on the reflection mirror 9 enables monitoring of the temperature of the reflection mirror 9, thereby preventing over heating of the reflection mirror 9. It also enables adjustments of the temperature and/or the flow volume of the coolant on the basis of temperature measurements of the thermocouple 24.

Further, the coolant supply route 33, assist gas supply route 31 and the signal wire 27 of the thermocouple 24 do not utilize movable tube or cable, the maintenance of such movable connection is not required. Further, since movable cables are not utilized, it becomes possible to continue revolving the torch head 5 in one direction. The arrangement of the present invention avoids the generation of non-uniformity of laser irradiation caused by the reversal of rotational direction, thereby enabling to practice application of coating of uniformly high quality.

What is claimed is:

1. A laser irradiating torch device radiating a laser beam from a forward end of said device for applying a coating to inner surfaces of a small diameter piping, said device comprising:

(a) a cylindrical torch body for insertion in said small diameter piping;

(b) a positioning device for positioning an axial center of said torch body with the axial center of said small diameter piping;

(c) a cylindrical torch head rotatably disposed at the forward end of said torch body and driven by a driving device so as to be freely rotatable around a center of said torch body;

(d) an optical fiber insertably disposed through the interior of said torch body for guiding said laser beam generated at the rearward end of said device to the interior of said torch head, said optical fiber being inserted through a rearward portion of said torch body;

(e) a lens holding tube disposed in the interior of said torch head and so as to be freely movable in the longitudinal direction of the torch body;

(f) a lens system disposed in the interior of said lens holding tube for focusing the laser beam radiated from the forward tip of said optical fiber and radiating in the longitudinal direction of said torch head; and (g) a reflection mirror freely movably disposed in the longitudinal direction in the interior of said torch head for reflecting said laser beam radially outwardly through a small diameter hole, wherein said positioning device is located between said cylindrical torch head and said rearward portion of said torch body.

2. A laser irradiating torch device as claimed in claim 1, wherein said positioning device comprises a plurality of positioning sections disposed in the longitudinal direction of said torch body.

3. A laser irradiating torch device as claimed in claim 2, wherein said positioning section comprises not less than three guide holes disposed around the circumferential periphery of said torch body; a small sphere disposed in each of said small holes; and a biasing spring disposed in each of said small holes.

4. A laser irradiating torch device as claimed in claim 3, wherein each of said guide holes is provided with a retaining jig to retain said small sphere.

5. A laser irradiating torch device as claimed in claim 1, wherein said driving device comprises a hollow shaft motor fixed to the torch body wherein said optical fiber passes through the interior of said hollow shaft motor.

6. A laser irradiating torch device as claimed in claim 1, wherein said torch head includes an assist gas supply route for supplying an cooling assist gas to the interior of said torch head.

7. A laser irradiating torch device as claimed in claim 1, wherein said reflection mirror includes:
(a) a heat sink member;
(b) a coolant supply route disposed through the interior spaces of said torch body and torch head or supplying a coolant to said heat sink member; and
(c) a coolant discharge route disposed through the interior spaces of said torch body and torch head for discharging a spent coolant.

8. A laser irradiating torch device as claimed in claim 1, wherein said reflection mirror includes a temperature measuring device for measuring the temperature of said reflection mirror.

9. A laser irradiating torch device as claimed in claim 8, wherein said temperature measuring device includes a slip ring for electrically connecting a signal wire to said temperature measuring device.

10. A laser irradiating torch device as claimed in claim 1, wherein said device further comprises:
(a) a protection tubing fixed to said torch body and disposed around said optical fiber, so as to be freely rotatable with respect to said torch head; and
(b) a fiber holding section, having outer surfaces mirror polished, disposed at the forward end of said protection tubing for holding a bared section of said optical fiber.

11. A laser irradiating torch device as claimed in claim 1, wherein said device further comprises:
(a) a head through hole of a minimum opening area disposed on an outer peripheral surface of said torch head and in the vicinity of said small diameter hole for passing said laser beam reflected by said reflection mirror; and
(b) a movable radiation shield disposed in the vicinity of said small diameter hole for shielding the laser beam reflected from the inner surfaces of said small diameter piping so as to enable positioning of said radiation shield to accommodate changes in the location of said reflection mirror.

* * * * *